United States Patent
Mashburn et al.

(10) Patent No.: US 10,815,365 B2
(45) Date of Patent: *Oct. 27, 2020

(54) SCATTER COATING PROCESS FOR SYNTHETIC TURF AND PRODUCT

(71) Applicant: Textile Rubber and Chemical Company, Inc., Dalton, GA (US)

(72) Inventors: Larry E Mashburn, Dalton, GA (US); Giuseppe V Tambasco, Marietta, GA (US)

(73) Assignee: Textile Rubber and Chemical Company Inc., Dalton, GA (US)

( * ) Notice: Subject to any disclaimer, the term of this patent is extended or adjusted under 35 U.S.C. 154(b) by 781 days.

This patent is subject to a terminal disclaimer.

(21) Appl. No.: 15/608,334

(22) Filed: May 30, 2017

(65) Prior Publication Data

US 2018/0347121 A1    Dec. 6, 2018

(51) Int. Cl.
    *C08L 23/06*    (2006.01)
    *D05C 17/02*    (2006.01)
    *C09D 123/04*    (2006.01)

(52) U.S. Cl.
    CPC .......... *C08L 23/06* (2013.01); *C09D 123/04* (2013.01); *D05C 17/02* (2013.01); *B32B 2262/0215* (2013.01); *C08L 2203/30* (2013.01)

(58) Field of Classification Search
    CPC ..... C08L 23/06; C09D 123/04; C09D 123/06; B29C 2037/0039; B29C 2059/028; B29C 65/4875
    See application file for complete search history.

(56) References Cited

U.S. PATENT DOCUMENTS

| 4,205,112 A | 5/1980 | Mervin |
| 4,808,459 A | 2/1989 | Smith et al. |

(Continued)

FOREIGN PATENT DOCUMENTS

| GB | 1106473 | 3/1968 |
| JP | 6322664 | 11/1994 |

(Continued)

OTHER PUBLICATIONS

European Search Report, Application No. 17189588.1 dated Nov. 17, 2017.

(Continued)

*Primary Examiner* — Stella K Yi
(74) *Attorney, Agent, or Firm* — Robert E. Richards; Richards IP Law

(57) ABSTRACT

The invention comprises a method of making synthetic turf. The method comprises applying a plurality of solid polyethylene polymer particles to a tufted primary backing of a tufted synthetic turf to form a coating thereon, wherein the solid polyethylene polymer particles have an average particle size of approximately 1 to approximately 1,000 microns and a melt index of approximately 50 to approximately 500 grams/10 minutes at 190° C. at a weight of 2.16 kg. and wherein the primary backing is tufted with a plurality of synthetic filaments to form a plurality of synthetic filaments extending outwardly from the side of the synthetic turf opposite the primary backing. The method also comprises heating the solid polyethylene particles to a temperature above their melting point so that the solid polyethylene polymer particles melt and at least partially flow into the primary backing and cooling the polyethylene polymer on the primary backing. A product made by the foregoing process is also disclosed.

21 Claims, 3 Drawing Sheets

(56) References Cited

U.S. PATENT DOCUMENTS

| | | |
|---|---|---|
| 4,836,871 A | 6/1989 | Kato |
| 5,856,376 A | 1/1999 | Wong |
| 5,902,663 A | 5/1999 | Justesen et al. |
| 5,962,564 A | 10/1999 | Braud et al. |
| 6,383,586 B1 | 5/2002 | Langland |
| 6,475,619 B2 | 11/2002 | Goldberg |
| 6,521,696 B2 | 2/2003 | Oates et al. |
| 6,673,432 B2 | 1/2004 | Kiik et al. |
| 6,743,741 B1 | 6/2004 | Araki et al. |
| 6,808,786 B2 | 10/2004 | Theiss |
| 7,018,492 B1 | 3/2006 | Mumm et al. |
| 7,081,498 B2 | 8/2006 | Moeller et al. |
| 7,267,870 B2 | 9/2007 | Matsumoto et al. |
| 7,335,423 B2 | 2/2008 | Huber |
| 7,348,048 B2 | 3/2008 | Rabasco et al. |
| 7,357,971 B2 | 4/2008 | Bieser et al. |
| 7,645,829 B2 | 1/2010 | Tse et al. |
| 7,816,003 B1 | 10/2010 | Luchio |
| 7,910,194 B2 | 3/2011 | Bieser et al. |
| 8,283,017 B2 | 10/2012 | Bieser et al. |
| 8,496,769 B2 | 7/2013 | Brumbelow et al. |
| 9,051,683 B2 | 6/2015 | Brumbelow et al. |
| 9,376,769 B2 | 6/2016 | Bieser et al. |
| 2001/0046581 A1 | 11/2001 | Brumbelow et al. |
| 2002/0134486 A1 | 9/2002 | Brumbelow et al. |
| 2004/0043184 A1 | 3/2004 | Kobayashi et al. |
| 2004/0258874 A1 | 12/2004 | Desai |
| 2005/0281977 A1 | 12/2005 | Mashburn |
| 2006/0013989 A1 | 1/2006 | Stull et al. |
| 2007/0071988 A1 | 3/2007 | Botros |
| 2007/0082172 A1 | 4/2007 | Derbyshire et al. |
| 2007/0254130 A1 | 11/2007 | Cheek |
| 2007/0259163 A1 | 11/2007 | Connolly et al. |
| 2007/0270064 A1 | 11/2007 | Aseere |
| 2008/0274307 A1 | 11/2008 | Chereau et al. |
| 2009/0022936 A1 | 1/2009 | McGill |
| 2010/0137493 A1 | 6/2010 | Tilton |
| 2010/0247814 A1 | 9/2010 | Nisikawa et al. |
| 2010/0310813 A1 | 12/2010 | McGill |
| 2013/0206630 A1 | 8/2013 | Burmeister |
| 2013/0261238 A1 | 10/2013 | Arango |
| 2013/0344281 A1 | 12/2013 | Wright et al. |
| 2014/0349060 A1 | 11/2014 | Mueller et al. |
| 2015/0086746 A1 | 3/2015 | B.R. de Castro et al. |
| 2016/0201239 A1 | 8/2016 | Baer et al. |
| 2016/0298003 A1 | 10/2016 | Alsoryai |
| 2019/0112756 A1* | 4/2019 | Mashburn ............ D06N 7/0036 |
| 2019/0360160 A1* | 11/2019 | Mashburn ............ D05C 17/023 |

FOREIGN PATENT DOCUMENTS

| | | |
|---|---|---|
| JP | 2008099805 | 10/2006 |
| KR | 20090130771 | 12/2009 |
| WO | 9506771 A1 | 3/1995 |
| WO | 9940250 A2 | 8/1999 |
| WO | 0132976 A1 | 5/2001 |
| WO | 0140561 A2 | 6/2001 |
| WO | 2004035910 A1 | 4/2004 |
| WO | 2006032433 A1 | 3/2006 |
| WO | 2008124449 A2 | 10/2008 |
| WO | 2014060796 | 4/2014 |

OTHER PUBLICATIONS

European Search Report, Application No. 17189839.8 dated Mar. 7, 2018.
Machine translation of JP 5148751.
Machine translation of JP 6322664.
Machine translation of JP 6059176.
U.S. Appl. No. 15/340,616, filed Nov. 1, 2016.
U.S. Appl. No. 15/469,637, filed Mar. 27, 2017.
English Abstract of JP 20899805.
U.S. Appl. No. 15/989,891, filed May 25, 2018.
U.S. Appl. No. 16/229,588, filed Dec. 21, 2018.
U.S. Appl. No. 16/679,653, filed Nov. 11, 2019.

* cited by examiner

SCATTER COATING PROCESS FOR SYNTHETIC TURF AND PRODUCT

FIELD OF THE INVENTION

The present invention generally relates to a novel coating/adhesive application system. More particularly, the present invention relates to a method for securing tufted yarns in a primary backing. The present invention also relates to a water permeable polymer precoat for synthetic turf. The present invention also relates to an improved synthetic turf.

BACKGROUND OF THE INVENTION

Synthetic turf is typically constructed from a primary backing material and a face pile formed on one side. Face pile can be formed in the primary backing by tufting a yarn in the primary backing. Currently, the majority of synthetic turf manufactured in the U.S. is made by a tufting process. The tufting process forms cut pile on one side of a primary backing and loop backs on the opposite side by a process well known in the art. The primary backing can be made from a woven or nonwoven fabric of synthetic materials. Typically, the primary backing of a synthetic turf is tufted with multiple strands that form a tufted fiber bundle.

After the primary backing is tufted, an adhesive precoat may be applied to lock or bind the tuft bundles in the primary backing. Typically, the adhesive precoat is a thermoset polyurethane polymer or an aqueous polymer dispersion, such as a styrene butadiene aqueous polymer dispersion. The thermoset polyurethane polymer or aqueous polymer dispersion-coated primary backing is then heated to initiate polyurethane polymerization or to remove the water from the aqueous polymer dispersion such that the polymer locks or binds the tuft loops in the primary backing. Then, a secondary backing may optionally be adhesively attached by applying a coating of adhesive on the side of the primary backing opposite the face pile. Such adhesive is typically a polyurethane, a latex or a hot melt adhesive. Then, a secondary backing is brought into intimate contact with the polymerizing polyurethane, uncured latex or the molten hot melt adhesive. The adhesive is then allowed to cool or cure, thereby adhesively attaching the secondary backing to the tufted primary backing.

It would be desirable to both achieve bundle lock and filament bind in a tufted primary backing of a synthetic turf using a single adhesive system. It would also be desirable to achieve bundle lock and filament bind using reduced amounts of adhesive without sacrificing desired physical properties of the finished product. Additionally, it would also be desirable to both achieve bundle lock, filament bind and attach a secondary backing to a tufted primary backing of a synthetic turf using a single adhesive system. Furthermore, it would be desirable to achieve bundle lock and filament bind using an adhesive system that also provides a water permeable polymer coating on the primary backing.

SUMMARY OF THE INVENTION

The present invention satisfies the foregoing needs by providing an improved system for making synthetic turf.

In one disclosed embodiment, the present invention comprises a method of making synthetic turf. The method comprises applying a plurality of solid polyethylene polymer particles to a first primary surface of a tufted primary backing to form a coating thereon, wherein the solid polyethylene polymer particles have an average particle size of approximately 1 to approximately 1,000 microns and a melt index of approximately 50 to approximately 500 grams/10 minutes at 190° C. at a weight of 2.16 kg. and wherein the primary backing is tufted with a plurality of synthetic filaments to form a plurality of synthetic filaments extending outwardly from the side of the synthetic turf opposite the primary backing. The method also comprises heating the solid polyethylene particles to a temperature above their melting point so that the solid polyethylene polymer particles melt and at least partially flow into the primary backing.

In another disclosed embodiment, the present invention comprises a method of making synthetic turf. The method comprises applying a plurality of solid polyethylene polymer particles to a first primary surface of a tufted primary backing to form a coating thereon, wherein the solid polyethylene polymer particles have an average particle size of approximately 1 to approximately 1,000 microns and a melt index of approximately 50 to approximately 500 grams/10 minutes at 190° C. at a weight of 2.16 kg. and wherein the primary backing is tufted with a plurality of synthetic filaments to form a plurality of synthetic filaments extending outwardly from the side of the synthetic turf opposite the primary backing. The method also comprises heating the solid polyethylene particles to a temperature above their melting point so that the solid polyethylene polymer particles melt and at least partially flow into the primary backing and applying a secondary backing to the melted polyethylene on the primary backing. The method further comprises cooling the polyethylene polymer on the primary backing so that the melted polyethylene polymer solidifies and attaches the secondary backing to the primary backing.

In another disclosed embodiment, the present invention comprises a method of making synthetic turf. The method comprises applying a plurality of solid polyethylene polymer particles to a tufted primary backing of a tufted synthetic turf to form a coating thereon, wherein the solid polyethylene polymer particles have an average particle size of approximately 1 to approximately 1,000 microns and a melt index of approximately 50 to approximately 500 grams/10 minutes at 190° C. at a weight of 2.16 kg. and wherein the primary backing is tufted with a plurality of synthetic filaments to form a plurality of synthetic filaments extending outwardly from the side of the synthetic turf opposite the primary backing. The method also comprises heating the solid polyethylene particles to a temperature above their melting point so that the solid polyethylene polymer particles melt and at least partially flow into the primary backing and cooling the polyethylene polymer on the primary backing so that the melted polyethylene polymer solidifies and provides a coating on the first primary surface. The method further comprises perforating the polyethylene polymer coating.

Accordingly, it is an object of the present invention to provide an improved synthetic turf adhesive system.

Another object of the present invention is to provide a synthetic turf adhesive system that requires the use of relatively smaller amounts of adhesive.

A further object of the present invention is to provide a synthetic turf adhesive system that does not sacrifice desired physical properties of the finished product.

A further object of the present invention is to provide an improved adhesive system for providing bundle lock and filament bind of a tufted pile in primary backing of a tufted synthetic turf.

Yet another object of the present invention is to provide an improved adhesive system for attaching a secondary backing to a primary backing of a synthetic turf.

Another object of the present invention is to provide an improved adhesive system that is more energy efficient than prior art systems.

Yet another object of the present invention is to provide an adhesive system for tufted synthetic turf that provides a water permeable polymer coating on the primary backing.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Figure 1:
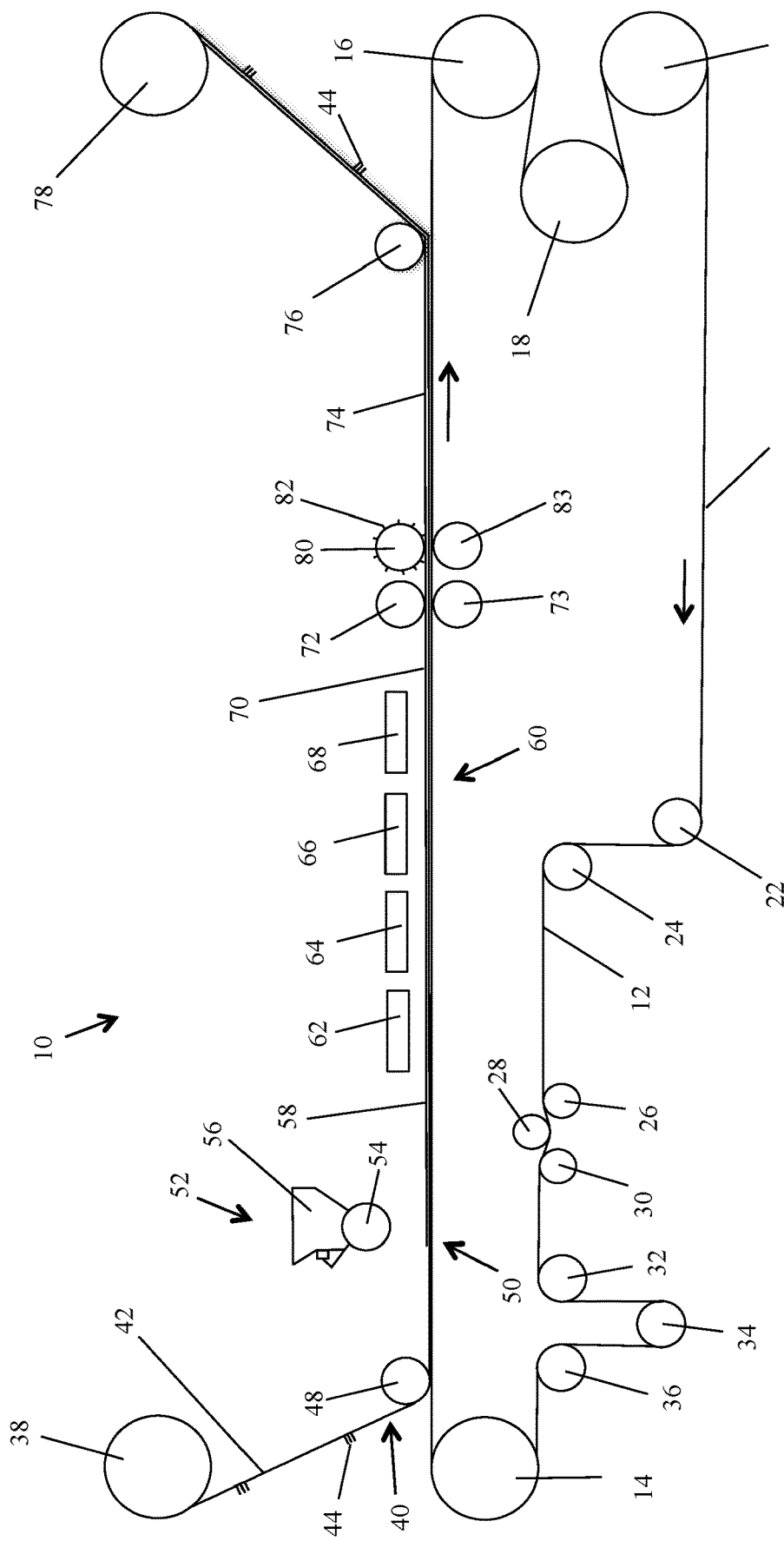
FIG. 1 is a schematic view of a disclosed embodiment of an apparatus for preparing synthetic turf using the adhesive system of the present invention.

Referring now to the drawing in which like numbers indicate like elements throughout the several views, there is shown in FIG. 1 a disclosed embodiment of an apparatus 10 for forming a polymer coating on the primary backing of a synthetic turf in accordance with the present invention. The apparatus 10 comprises an endless conveyor belt 12 extending along an endless conveyor path over four drive rollers 14, 16, 18 and 20, which are driven by an electric motor (not shown), idler rollers 22, 24, belt guide rollers 26, 28, 30 and belt tensioner rollers 32, 34 and 36. The speed of the belt 12 is variably controllable to adjust to varying manufacturing needs.

From the drive roller 14, the conveyor belt 12, which preferably is constructed from Teflon coated fiberglass, is seen to pass around the drive rollers 16, 18, 20. The belt 12 is delivered to the idler rollers 22, 24, to the belt guide rollers 26, 28, 30, to the belt tensioner rollers 32, 34, 36 and then back to the drive roller 14.

Figure 2:
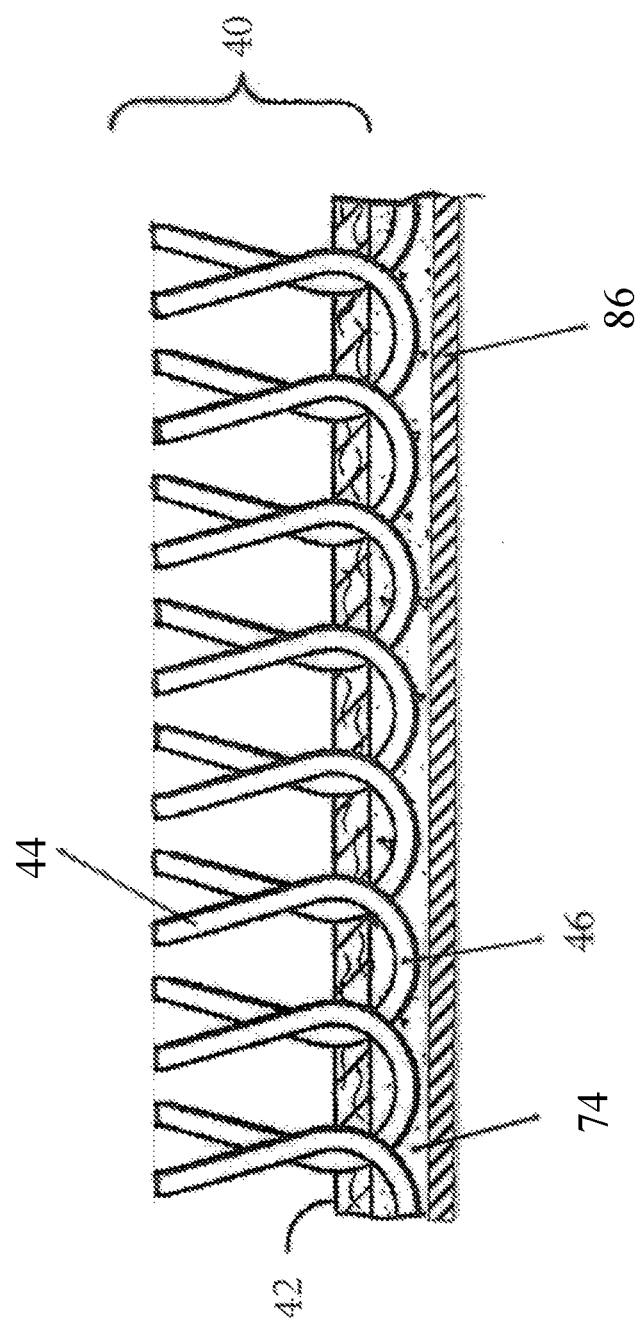
FIG. 2 is a cross-sectional side view of a tufted synthetic turf in accordance with the present invention.

Positioned above the belt 12 adjacent the drive roller 14 is a supply roll 38 of tufted greige goods 40 (FIG. 2). The tufted greige goods 40 comprise a synthetic primary backing material 42 and tufted synthetic yarns or filaments that form a face pile 44 on one side of the primary backing material and loop backs 46 on the other side of the primary backing material. The face pile 44 is can be either looped pile or cut pile. However, face pile useful in the present invention is preferably cut pile or individual filaments. The primary backing material 42 can be woven or nonwoven. Both the face pile 44 and the primary backing material 42 can be made from natural or synthetic materials. Furthermore, the face pile 44 and primary backing material 42 can be made from the same material or different materials. Suitable thermoplastic materials for the face pile 44 and primary backing material 42 is preferably polypropylene.

The tufted greige goods 40 is fed from the supply roll 38, around a roller 48 and onto the belt 12 where it lays flat on the surface of the belt and moves in unison with the belt. As can be seen in FIG. 1, the tufted greige goods 40 is positioned so that the face pile 44 extends downwardly from the primary backing material 42 so that the face pile is adjacent to and contacts the belt 12 and the primary backing material faces upwardly. The tufted greige goods 40 on the belt 12 moves from the roller 48 to a polymer deposition station 50. The polymer deposition station 50 comprises a solid particle scatter coater 52 disposed above the tufted greige goods 40 on the belt 12. The particle scatter coater 52 comprises a knurled roller 54 that extends across the width of the primary backing material 42. The knurled roller 54 is rotatably driven by a variable speed motor (not shown). The knurled roller 54 is positioned below a hopper 56 that interfaces with the knurled roller so that solid particles disposed in the hopper are picked up by the knurls of the knurled roller as it rotates. As the knurled roller 54 rotates, the solid particles fall from the knurled roller onto the surface of the primary backing material 42 and form a randomly dispersed coating of solid particles thereon. Scatter coaters are known in the art and are commercially available from Practix Manufacturing LLC, Acworth, Ga. and Sandvik TPS Division of Sandvik Materials Technology Deutschland GmbH, Goppingen, Germany.

The solid polymer particles that are used to scatter coat the primary backing material 42 preferably comprise solid polymer particles, more preferably solid polyethylene particles. The polyethylene is in solid particulate form having an average particle size (volume-based) of approximately 1 to approximately 1,000 microns. Stated another way, the size of the solid polyethylene particles is such that they will pass through a 18-mesh screen. The solid polyethylene polymer particles can be ground from polyethylene polymer pellets to the desired particle sizes using methods known in the art including, but not limited to, a pulverizer or a hammer mill. Additionally, the polyethylene from which the solid particles are made preferably has a melt index of approximately 50 to approximately 500 g/10 minutes at 190° C. and at a weight of 2.16 kg., more preferably approximately 150 to approximately 250 g/10 minutes at 190° C., especially approximately 200 g/10 minutes at 190° C. and at a weight of 2.16 kg. Melt Index as used herein is the measurement procedure set forth in ASTM D1238-13. Furthermore, the polyethylene from which the solid particles are made preferably has a melting point of approximately 150 to approximately 250° F., more preferably approximately 200 to approximately 235° F., especially approximately 215° F.

The solid polyethylene particles dispensed from the scatter coater 52 form a random coating of solid particles 58 on the primary backing material 42 preferably at a rate of approximately 5 to approximately 20 ounces of polyethylene particles per square yard of primary backing material; more preferably approximately 8 to approximately 16 ounces of polyethylene particles per square yard of primary backing material.

Optionally, the polyethylene polymer from which the solid particles are formed can include additives including, but not limited to, pigments, plasticizing aids, a lubricant, a blowing agent, a fire retardant, an inert filler and/or rheological modifiers.

The tufted primary backing material 42 bearing the coating or layer 58 of solid polyethylene particles on the belt 12 moves from the polymer deposition station 50 to a polymer particle melting station 60. The polymer particle melting station 60 comprises a plurality of infrared heaters 62, 64, 66, 68 disposed above the tufted primary backing material 42 bearing the layer 58 of solid polyethylene polymer particles on the primary backing material. The infrared heaters 62-68 are positioned a distance above the belt 12, the belt is at a speed and the infrared heaters are of a size such that the residence time of the tufted primary backing material 42 bearing the layer 58 of solid polyethylene polymer particles under the infrared heaters is such that the solid polyethylene polymer particles on the primary backing material are heated to a temperature sufficient to melt the solid polyethylene polymer particles so that they are fluid. The objective of using the infrared heaters 62-68 is to convert the solid polyethylene polymer particles to a flowable material or a liquid layer 70 on the primary backing material 42.

As the tufted primary backing material 42 bearing the melted polyethylene polymer particles moves from the polymer particle melting station 60 and passes between a chilled press roller assembly comprising a first chilled press roller 72 disposed above the belt 12 and a second opposed chilled press roller 73 disposed below the belt. The chilled press roller 72, 73 are hollow rollers into which coolant is circulated. As the primary backing material 42 and the molten layer 70 of polyethylene polymer pass under the chilled press roller 72, the molten layer of polyethylene polymer is formed into a film 74 and pressed into intimate contact with the primary backing material. The pressure of the chilled press roller 72 on the molten layer 70 of polyethylene polymer causes the melted polymer particles to flow into both the primary backing material 42 and the loop backs 46 or tuft bundles in the primary backing material. Then, the chilled press roller 72 cools the molten layer 70 of polyethylene polymer and causes it to solidify into a film 74 thereby securely anchoring the loop backs 46 and/or tuft bundles in the primary backing material 42.

The polymer coated turf structure moves with the belt 12 from the chilled press roller 72 to a stripping roller 76 where the polymer coated turf structure is removed from the belt and collected in a take up roll 78.

Unexpectedly, the polyethylene film 74 on the primary backing material 42 is water permeable. Water permeability of synthetic turf is determined according to ASTM F1551-09 or FIFA/EN 12616 and DIN 18-035. These testing procedures require a water permeability of the synthetic turf (after installation) of greater than 10 inches of water per hour. The synthetic turf including the polyethylene film 74 in accordance with the present invention meets the foregoing requirement for water permeability, while still providing acceptable tuft bind or bundle lock (without infill) of 6.8 lbs (or 30N) and filament bind or filament slippage in accordance with ASTM D1335 or ISO 4919. The synthetic turf in accordance with the present invention meets the guidelines of the Synthetic Turf Council as set forth in the "Guidelines for Synthetic Turf Performance (2013)."

Optionally, the apparatus 10 can include can include a spiked press roller 80 that includes a multitude of spikes 82 extending radially outwardly from the surface of the press roller around the periphery thereof. An opposed slotted press roller 83 is disposed below the belt 12. Therefore, as the polymer-coated turf structure moves with the belt 12 from the chilled press rollers 72, 73 it passes between the spiked press roller 80 and the slotted press roller 83. As the polymer-coated turf structure passes under the spiked press roller 80, the spikes 82 form a matrix of holes in the film 74 on the primary backing material 42. The spiked press roller 80 rotates with the movement of the polymer-coated turf with the belt 12 under the spiked press roller thereby forming a matrix of perforation in the polyethylene film 74 across the width and length of the turf structure. The perforated film 74 provides additional water permeability to the synthetic turf. The spiked press roller 80 and the slotted press roller 83 can optionally be chilled. For this option, the chilled spiked press roller 80 and the slotted press roller 83 are hollow rollers into which coolant is circulated.

Optionally, the apparatus 10 can be operated without the chilled press roller 72, but includes the spiked press roller 80 and the slotted press roller 83 that are chilled. In this configuration, the chilled spiked press roller 80 presses the molten layer 70 of polyethylene into intimate contact with the primary backing material 42. The pressure of the spiked chilled press roller 80 on the molten layer 70 of polyethylene polymer causes the melted polymer particles to flow into both the primary backing material 42 and the loop backs 46 or tuft bundles in the primary backing material 42. Then, the chilled spiked press roller 80 and the chilled slotted press roller 83 cools the molten layer 70 of polyethylene polymer and causes it to solidify into a film 74 thereby securely anchoring the loop backs 46 and/or tuft bundles in the primary backing material 42. Simultaneously, the chilled spiked press roller 80 also forms a plurality of holes in the film 74 on the primary backing material 42.

Figure 3:
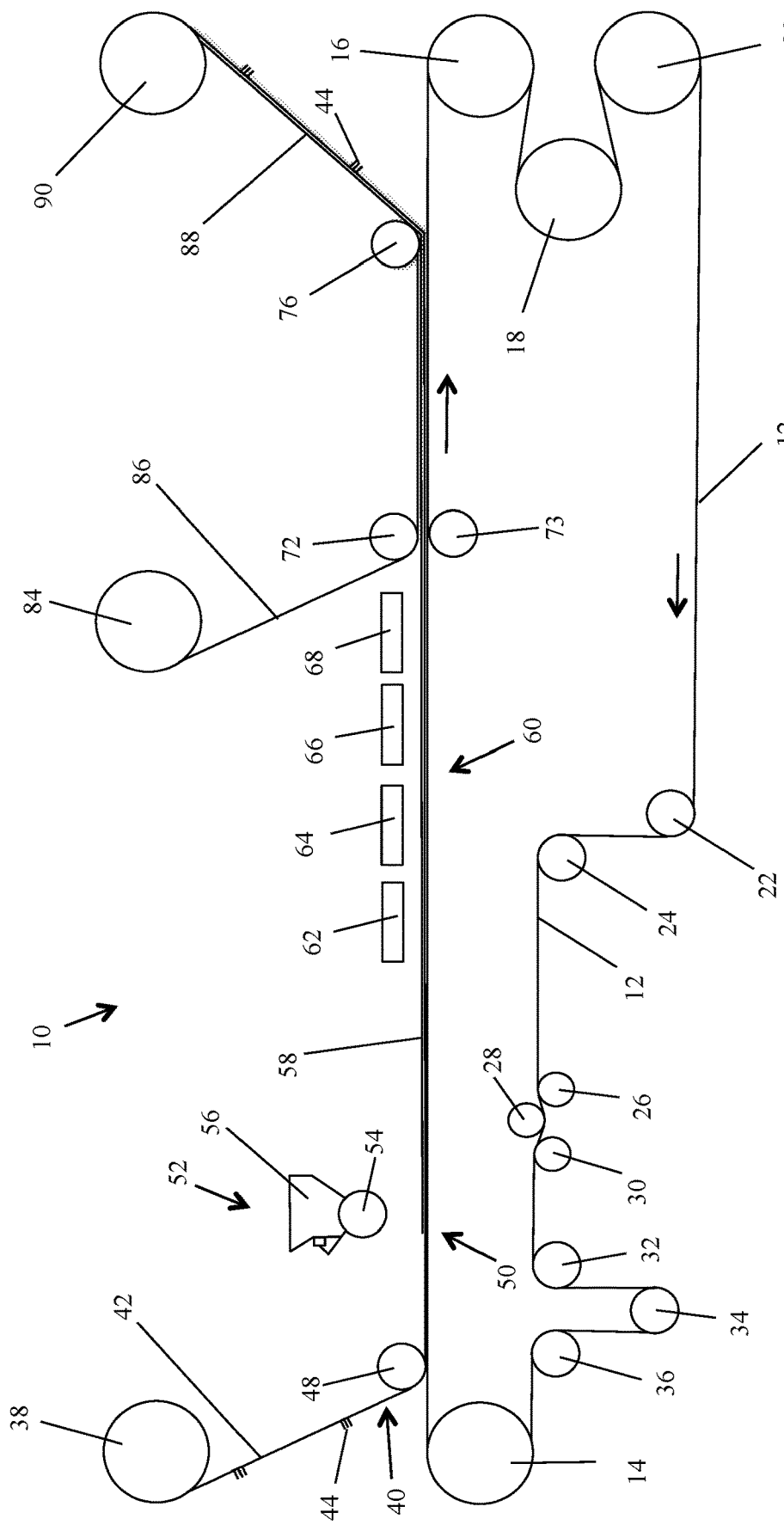
FIG. 3 is a schematic view of another disclosed embodiment of an apparatus for preparing synthetic turf using the adhesive system of the present invention.

FIG. 3 shows an alternate disclosed embodiment of the present invention. The apparatus shown in FIG. 3 is identical to the apparatus shown in FIG. 1, except there is a secondary backing involved. The processing of the turf in FIG. 3 is also identical to that shown in FIG. 1 up to the point where the molten polyethylene coated primary backing 42 emerges from the bank of infrared heaters 62-68.

Disposed above the belt 12 is a supply roll 84 of a secondary backing material 86. The secondary backing material 86 feeds from the supply roll 84 under the chilled press roller 72. As the tufted primary backing material 42 bearing the layer 70 of molten polyethylene polymer moves from the polymer particle melting station 60 and passes under the chilled press roller 72, the secondary backing material 86 is pressed into intimate contact with the melted polyethylene polymer on the tufted primary backing material 42. The pressure of the chilled press roller 72 on the primary backing material 42 and the secondary backing material 86 causes the melted polyethylene polymer to flow into both the primary backing material and the secondary backing material. Then, the chilled press roller 72 cools the secondary backing material 86, which in turn removes heat from the melted polyethylene polymer and causes it to solidify thereby securely attaching the secondary backing material to the primary backing material 42 and also further securely anchoring the loop backs 46 in the primary backing material, which forms a laminated synthetic turf structure 88.

The secondary backing material 86 can be woven or nonwoven. The secondary backing material 86 can be made from natural or synthetic materials. Furthermore, the primary backing material 42 and the secondary backing material 86 can be made from the same material or different materials. However, it is particularly preferred that the face pile 44, the primary backing material 42 and the secondary backing material 86 all be made from thermoplastic polymer materials. Suitable thermoplastic polymer materials for the secondary backing material 86 include, but are not limited to, nylon, including polyadipamide, polycaprolactam, copolymers, and blends thereof; polyolefin, including polyethylene, polypropylene, copolymers and blends thereof; thermoplastic polyester, including polytrimethyleneterephthlate and polyethyleneterephthalate, and blends thereof; acrylics, including polyacrylonitrile; copolymers and blends thereof. It is particularly preferred that the face pile 44, the primary backing material 42 and the secondary backing material 86 all be made from the same or similar (compatible) thermoplastic polymers.

The laminated synthetic turf structure 88 moves with the belt 12 from the chilled press rollers 72, 73 to a stripping roller 76 where the laminated turf structure is removed from the belt and collected in a take up roll 90.

The following examples are illustrative of selected embodiments of the present invention and are not intended to limit the scope of the invention.

Example 1

A tufted synthetic turf is prepared in accordance with the present invention using the apparatus disclosed in FIG. 1. The primary backing is tufted with 5 strands per tuft bundle. The greige goods comprise a 2-inch pile height of polyethylene strands tufted into a woven polypropylene primary backing. Polyethylene polymer pellets are ground to form fine particles having a volume-based average particle size of approximately 590 microns. The polyethylene has a melting point of 225° F. and a melt index of 200 g/10 min. at 190° C. and a weight of 2.16 kg. as measured in accordance with ASTM D1238-13.

The polyethylene particles are applied to the primary backing of the greige goods 42 from the scatter coater 52 to form a layer thereon at the rate of 15 ounces per square yard. The particle-coated primary backing 58 is passed under the bank of infrared heaters 62-68 to heat the polymer particles. The polyethylene particles are heated to a temperature above their melting point so that they are rendered flowable. The primary backing bearing the coating of melted polyethylene is passed under the chilled press roller 72 so that the molten polyethylene is turned into a solid film on the primary backing.

The synthetic turf is tested for bundle lock and filament slippage (filament bind). Bundle lock results are shown in Table 1 below and the filament slippage results are shown in Table 2 below. The tested water permeability rate of the coated turf (with no infill and prior to installation on a field) is 124 inches per hour, which is more than sufficient to pass the STC requirements.

TABLE 1

Tuft bind results of coated synthetic turf.

| Sample # | Bundle Lock (lbf) |
|---|---|
| Sample 1655 | 11.795 |
| Sample 1656 | 13.942 |
| Sample 1657 | 13.087 |
| Sample 1658 | 13.686 |
| Sample 1659 | 14.527 |
| Sample 1660 | 12.899 |
| Sample 1661 | 13.013 |
| Sample 1662 | 13.067 |
| Sample 1663 | 13.511 |
| Sample 1664 | 13.209 |
| Sample 1665 | 13.592 |
| Sample 1666 | 12.186 |
| Sample 1667 | 13.276 |
| Sample 1668 | 13.377 |
| Sample 1669 | 11.607 |
| Average | 13.118 |
| Min | 11.607 |
| Max | 14.527 |

TABLE 2

Filament slippage test results for coated synthetic turf.

| Sample # | Filament Slip (lbf) |
|---|---|
| Sample 1670 | 2.739 |
| Sample 1671 | 3.203 |
| Sample 1672 | 2.981 |
| Sample 1673 | 3.324 |
| Sample 1674 | 2.692 |
| Sample 1675 | 3.169 |
| Sample 1676 | 3.115 |
| Sample 1677 | 3.048 |
| Sample 1678 | 3.378 |
| Sample 1679 | 3.163 |
| Sample 1680 | 3.25 |
| Sample 1681 | 3.237 |
| Sample 1682 | 3.062 |
| Sample 1683 | 3.122 |
| Sample 1684 | 3.223 |
| Average | 3.114 |
| Min | 2.692 |
| Max | 3.378 |

Example 2

A tufted synthetic turf is prepared in accordance with the present invention using the apparatus disclosed in FIG. 3. The primary backing is tufted with 5 strands per tuft bundle. The greige goods comprise a 2-inch pile height of polyethylene strands tufted into a woven polypropylene primary backing. Polyethylene polymer pellets are ground to form fine particles having a volume-based average particle size of approximately 590 microns. The polyethylene has a melting point of 225° F. and a melt index of 200 g/10 min. at 190° C. and a weight of 2.16 kg., as measured in accordance with ASTM D1238-13.

The polyethylene particles are applied to the primary backing of the greige goods 42 from the scatter coater 53 to form a layer thereon at the rate of 15 ounces per square yard. The particle-coated primary backing 58 is passed under the bank of infrared heaters 62-68 to heat the polymer particles. The polyethylene particles are heated to a temperature above their melting point so that they are rendered flowable. Using the apparatus shown in FIG. 3 the primary backing bearing the coating of melted polyethylene 70 is passed under the chilled press roller 72 while a roll of 4.5 ounce/yd$^2$ polyester nonwoven secondary fabric 86 is fed in to the top side of the press roller 72 and pressed into intimate contact with the molten polyethylene. The resulting composite is tested for tuft bind and delamination strength with results shown in Table 3 and Table 4 respectively below.

TABLE 3

Tuft bind of synthetic turf with secondary fabric

| Sample # | Tuft Bind (lbf) |
|---|---|
| Sample 2388 | 12.778 |
| Sample 2389 | 13.437 |
| Sample 2390 | 14.366 |
| Sample 2391 | 13.249 |
| Sample 2392 | 14.016 |
| Average | 13.569 |
| Min | 12.778 |
| Max | 14.366 |

TABLE 4

Delamination strength of synthetic turf with secondary fabric

| Sample # | Delamination (lbf) |
|---|---|
| Sample 2387 Peak 1 | 7.227 |
| Sample 2387 Peak 2 | 6.016 |
| Sample 2387 Peak 3 | 5.587 |
| Sample 2387 Peak 4 | 5.926 |
| Sample 2387 Peak 5 | 6.471 |
| Average | 6.245 |
| Min | 5.587 |
| Max | 7.227 |

These foregoing results show that a single compound can be used to achieve desirable tuft bind as well as delamination strength in a single processing step.

Example 3

A tufted synthetic turf is prepared in accordance with the present invention using the apparatus disclosed in FIG. 1. The primary backing is tufted with 5 strands per tuft bundle. The greige goods comprise a 2-inch pile height of polyethylene strands tufted into a woven polypropylene primary backing. Polyethylene polymer pellets are ground to form fine particles having a volume-based average particle size of approximately 590 microns. The polyethylene has a melting point of 225° F. and a melt index of 200 g/10 min. at 190° C. and a weight of 2.16 kg., as measured in accordance with ASTM D1238-13.

The polyethylene particles are applied to the primary backing of the greige goods 42 from the scatter coater 52 to form a layer thereon at the rate of 15 ounces per square yard. The particle-coated primary backing 58 is passed under the bank of infrared heaters 62-68 to heat the polymer particles. The polyethylene particles are heated to a temperature above their melting point so that they are rendered flowable. Using the apparatus shown in FIG. 1, the primary backing bearing the coating of melted polyethylene 70 is pressed between the spiked press roll 80 and the slotted roller 83 in order to mold holes into the polyethylene film (the chilled press rollers 72, 73 are omitted in this embodiment). The spikes 82 of the chilled spiked press roller 80 creates ⅛ inch diameter holes spaced at ½ inch intervals from each other in both the length and width direction. The drainage rate of this synthetic turf with the perforated polyethylene film without infill or installation is 3600 inches per hour. When the spiked press roller 80 creates ⅛ inch diameter holes spaced at 1-inch intervals in the length and width direction, the drainage rate is 1800 inches per hour. And, when the spiked press roller 80 creates ⅛ inch diameter holes spaced at 1.5 inch intervals in the length and width direction, the drainage rate is 1030 inches per hour. Each of these values is sufficient to pass the ASTM F1551-09 or FIFA/EN 12616 standards for water permeability of synthetic turf.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method of making synthetic turf comprising:
applying a plurality of solid polyethylene polymer particles to a first primary surface of a tufted primary backing to form a coating thereon, wherein the solid polyethylene polymer particles have an average particle size of approximately 1 to approximately 1,000 microns and a melt index of approximately 50 to approximately 500 grams/10 minutes at 190° C. at a weight of 2.16 kg. and wherein the primary backing is tufted with a plurality of synthetic filaments to form a plurality of synthetic filaments extending outwardly from the side of the synthetic turf opposite the primary backing; and
heating the solid polyethylene particles to a temperature above their melting point so that the solid polyethylene polymer particles melt and at least partially flow into the primary backing.

2. The method of claim 1, further comprising cooling the polyethylene polymer on the primary backing so that the melted polyethylene polymer solidifies and provides a water permeable coating on the primary backing.

3. The method of claim 1, wherein the polyethylene has a melt index of approximately 150 to approximately 250 g/10 minutes at 190° C. at 2.16 kg.

4. The method of claim 1, wherein the polyethylene has a melt index of approximately 200 g/10 minutes at 190° C. at 2.16 kg.

5. The method of claim 1, wherein the polyethylene has a melting point of approximately 150 to approximately 250° F.

6. The method of claim 1, wherein the polyethylene has a melting point of approximately 200 to approximately 235° F.

7. The method of claim 1, wherein the polyethylene has a melting point of approximately 215° F.

8. The method of claim 1, wherein solid polyethylene polymer particles are applied to the primary backing at a rate of approximately 5 to approximately 20 ounces of polyethylene particles per square yard of primary backing.

9. The method of claim 1, wherein solid polyethylene polymer particles are applied to the primary backing at a rate of approximately 8 to approximately 16 ounces of polyethylene particles per square yard of primary backing.

10. The method of claim 2, further comprising perforating the solidified polyethylene on the primary backing.

11. The method of claim 1, wherein the primary backing comprises a woven or nonwoven thermoplastic material.

12. The method of claim 1, wherein the primary backing is tufted with thermoplastic polymer fibers or strands.

13. The method of claim 2, wherein the water permeable coating on the primary backing has a water permeability of at least 10 inches of water per hour.

14. The method of claim 2, wherein the synthetic turf has bundle lock of at least 6.8 pounds.

15. A method of making synthetic turf comprising:
applying a plurality of solid polyethylene polymer particles to a first primary surface of a tufted primary backing to form a coating thereon, wherein the solid polyethylene polymer particles have an average particle size of approximately 1 to approximately 1,000 microns and a melt index of approximately 50 to approximately 500 grams/10 minutes at 190° C. at a weight of 2.16 kg. and wherein the primary backing is tufted with a plurality of synthetic filaments to form a plurality of synthetic filaments extending outwardly from the side of the synthetic turf opposite the primary backing;
heating the solid polyethylene particles to a temperature above their melting point so that the solid polyethylene polymer particles melt and at least partially flow into the primary backing;
applying a secondary backing to the melted polyethylene on the primary backing; and cooling the polyethylene polymer on the primary backing so that the melted polyethylene polymer solidifies and attaches the secondary backing to the primary backing.

16. The method of claim 15, wherein the polyethylene has a melt index of approximately 150 to approximately 250 g/10 minutes at 190° C. at 2.16 kg.

17. The method of claim 15, wherein the polyethylene has a melt index of approximately 200 g/10 minutes at 190° C. at 2.16 kg.

18. The method of claim 15, wherein the polyethylene has a melting point of approximately 150 to approximately 250° F.

19. The method of claim 15, wherein the polyethylene has a melting point of approximately 200 to approximately 235° F.

20. A method of making synthetic turf comprising:
applying a plurality of solid polyethylene polymer particles to a tufted primary backing of a tufted synthetic turf to form a coating thereon, wherein the solid polyethylene polymer particles have an average particle size of approximately 1 to approximately 1,000 microns and a melt index of approximately 50 to approximately 500 grams/10 minutes at 190° C. at a weight of 2.16 kg. and wherein the primary backing is tufted with a plurality of synthetic filaments to form a plurality of synthetic filaments extending outwardly from the side of the synthetic turf opposite the primary backing;
heating the solid polyethylene particles to a temperature above their melting point so that the solid polyethylene polymer particles melt and at least partially flow into the primary backing;
cooling the polyethylene polymer on the primary backing so that the melted polyethylene polymer solidifies and provides a coating on the first primary surface; and
perforating the polyethylene polymer coating.

21. The method of claim 20, wherein the cooling and perforating steps are performed simultaneously.

* * * * *